US012650881B2

(12) United States Patent
Jones et al.

(10) Patent No.: US 12,650,881 B2
(45) Date of Patent: Jun. 9, 2026

(54) TECHNIQUE FOR COMPUTATIONAL NESTED PARALLELISM

(71) Applicant: NVIDIA Corporation, Santa Clara, CA (US)

(72) Inventors: Stephen Jones, San Francisco, CA (US); Philip Alexander Cuadra, San Francisco, CA (US); Daniel Elliot Wexler, Soda Springs, CA (US); Ignacio Llamas, Sunnyvale, CA (US); Lacky V. Shah, Los Altos Hills, CA (US); Jerome F. Duluk, Jr., Palo Alto, CA (US); Christopher Lamb, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 17/169,283

(22) Filed: Feb. 5, 2021

(65) Prior Publication Data

US 2021/0349763 A1      Nov. 11, 2021

Related U.S. Application Data

(63) Continuation of application No. 16/746,714, filed on Jan. 17, 2020, which is a continuation of application
(Continued)

(51) Int. Cl.
| | |
|---|---|
| *G06F 9/52* | (2006.01) |
| *G06F 9/50* | (2006.01) |
| *G06T 1/20* | (2006.01) |

(52) U.S. Cl.
CPC ............ *G06F 9/5027* (2013.01); *G06F 9/522* (2013.01); *G06T 1/20* (2013.01); *G06F 2209/483* (2013.01)

(58) Field of Classification Search
CPC .. G06F 9/5027; G06F 9/522; G06F 2209/483; G06T 1/20
See application file for complete search history.

(56) References Cited

U.S. PATENT DOCUMENTS

| | | | |
|---|---|---|---|
| 5,193,186 | A | 3/1993 | Tamaki et al. |
| 5,261,067 | A | 11/1993 | Whelan |

(Continued)

OTHER PUBLICATIONS

Nickolls et al., "Scalable Parallel Programming", Mar./Apr. 2008, ACM Queue, pp. 40-53. (Year: 2008).*

(Continued)

*Primary Examiner* — Kenneth Tang
(74) *Attorney, Agent, or Firm* — Davis Wright Tremaine LLP

(57) ABSTRACT

One embodiment of the present invention sets forth a technique for performing nested kernel execution within a parallel processing subsystem. The technique involves enabling a parent thread to launch a nested child grid on the parallel processing subsystem, and enabling the parent thread to perform a thread synchronization barrier on the child grid for proper execution semantics between the parent thread and the child grid. This technique advantageously enables the parallel processing subsystem to perform a richer set of programming constructs, such as conditionally executed and nested operations and externally defined library functions without the additional complexity of CPU involvement.

20 Claims, 10 Drawing Sheets

Related U.S. Application Data

No. 15/368,434, filed on Dec. 2, 2016, now Pat. No. 10,915,364, which is a continuation of application No. 13/462,649, filed on May 2, 2012, now Pat. No. 9,513,975.

(56) References Cited

U.S. PATENT DOCUMENTS

| | | | |
|---|---|---|---|
| 6,088,044 | A | 7/2000 | Kwok et al. |
| 7,650,602 | B2 | 1/2010 | Amamiya et al. |
| 8,112,614 | B2 | 2/2012 | Nickolls et al. |
| 8,621,465 | B2 | 12/2013 | Leong et al. |
| 9,015,683 | B2 | 4/2015 | Cho et al. |
| 9,104,500 | B1 | 8/2015 | Krikellas et al. |
| 9,513,975 | B2 | 12/2016 | Jones et al. |
| 9,715,413 | B2 | 7/2017 | Abdalla et al. |
| 2002/0004966 | A1 | 1/2002 | Wakat et al. |
| 2002/0116436 | A1 | 8/2002 | Whitton |
| 2003/0014473 | A1 | 1/2003 | Ohsawa et al. |
| 2003/0163648 | A1* | 8/2003 | Smith ................. G06F 12/0837 |
| | | | 711/E12.039 |
| 2004/0049672 | A1 | 3/2004 | Nollet et al. |
| 2004/0064818 | A1 | 4/2004 | Alverson et al. |
| 2004/0158833 | A1 | 8/2004 | Dickson |
| 2005/0050305 | A1 | 3/2005 | Kissell |
| 2005/0210472 | A1 | 9/2005 | Accapadi et al. |
| 2006/0136915 | A1* | 6/2006 | Aingaran .............. G06F 9/4881 |
| | | | 712/E9.05 |
| 2006/0212868 | A1 | 9/2006 | Takayama et al. |
| 2007/0067770 | A1 | 3/2007 | Thomasson |
| 2008/0077921 | A1 | 3/2008 | Chaudhary et al. |
| 2009/0006407 | A1* | 1/2009 | Magruder ........... G06F 16/2343 |
| 2009/0031310 | A1 | 1/2009 | Lev et al. |
| 2009/0077082 | A1* | 3/2009 | Magruder ........... G06F 16/2358 |
| 2009/0259996 | A1 | 10/2009 | Grover et al. |
| 2010/0161948 | A1 | 6/2010 | Abdallah |
| 2010/0162247 | A1* | 6/2010 | Welc ........................ G06F 9/466 |
| | | | 718/101 |
| 2011/0022817 | A1 | 1/2011 | Gaster et al. |
| 2011/0035737 | A1 | 2/2011 | Stefansson et al. |
| 2011/0055531 | A1 | 3/2011 | Bellows |
| 2011/0072211 | A1 | 3/2011 | Duluk, Jr. et al. |
| 2011/0078690 | A1* | 3/2011 | Fahs ..................... G06F 9/3851 |
| | | | 718/102 |
| 2011/0078692 | A1* | 3/2011 | Nickolls ............. G06F 9/30087 |
| | | | 718/103 |
| 2011/0087860 | A1 | 4/2011 | Nickolls et al. |
| 2011/0264867 | A1 | 10/2011 | Wan et al. |
| 2012/0042303 | A1 | 2/2012 | Demetriou et al. |
| 2012/0092352 | A1* | 4/2012 | Mallick .................... G06T 1/00 |
| | | | 345/520 |
| 2012/0137075 | A1 | 5/2012 | Vorbach |
| 2012/0180072 | A1 | 7/2012 | Sander et al. |
| 2012/0200579 | A1 | 8/2012 | Hartog et al. |
| 2013/0080073 | A1 | 3/2013 | de Corral |
| 2013/0117758 | A1 | 5/2013 | Cuadra et al. |
| 2013/0125133 | A1* | 5/2013 | Schuster ................. G06F 9/522 |
| | | | 718/105 |
| 2013/0238938 | A1 | 9/2013 | Baliga et al. |
| 2014/0337587 | A1 | 11/2014 | Hower et al. |

OTHER PUBLICATIONS

Marongiu et al., "An OpenMP Compiler for Efficient Use of Distributed Scratchpad MEmory in MPSoCs", IEEE Transactions on Computers, vol. 61, No. 2, Feb. 2012, pp. 222-236. (Year: 2012).*

Liang et al., "Enabling Mixed OpenMP/MPI Programming on Hybrid CPU/GPU Computing Architecture," IEEE 26th International Parallel and Distributed Processing Symposium Workshops & PhD Forum (IPDPSW), May 2012, 9 pages.

United States Advisory Action, U.S. Appl. No. 13/462,649, filed Apr. 20, 2016, 3 pages.

United States Office Action, U.S. Appl. No. 13/462,649, filed Dec. 31, 2015, 19 pages.

United States Office Action, U.S. Appl. No. 13/462,649, filed Jun. 17, 2015, 17 pages.

United States Office Action, U.S. Appl. No. 13/462,649, filed Mar. 6, 2014, 18 pages.

United States Office Action, U.S. Appl. No. 13/462,649, filed Oct. 24, 2014, 16 pages.

Steffen et al., "Improving SIMT Efficiency of Global Rendering Algotithms with Architectural Support for Dynamic Micro-Kernels", 2010, 43rd Annual IEEE/ACM International Symposium on Microarchitecture, 12 pages.

* cited by examiner

Tasks From
Front End
212

Task/Work Unit 207

Task
Management
Unit
300

Scheduler
Table
321

TMD
322

Task
Distribution
Unit
340

Task
Table
345

From
Processing
Cluster Array
230

To/From
Processing Cluster Array
230

From
Processing
Cluster
Array
230

From Pipeline Manager 305
In GPC 208

TECHNIQUE FOR COMPUTATIONAL NESTED PARALLELISM

CROSS-REFERENCE TO RELATED APPLICATIONS

This application is a continuation of U.S. application Ser. No. 16/746,714, entitled "TECHNIQUE FOR COMPUTATIONAL NESTED PARALLELISM" filed Jan. 17, 2020, which is a continuation of U.S. application Ser. No. 15/368, 434, entitled "TECHNIQUE FOR COMPUTATIONAL NESTED PARALLELISM" filed Dec. 2, 2016, which is a continuation of U.S. application Ser. No. 13/462,649 entitled "TECHNIQUE FOR COMPUTATIONAL NESTED PAR-ALLELISM" filed on May 2, 2012, now U.S. Pat. No. 9,513,975, the disclosures of which are incorporated by reference herein in their entirety.

BACKGROUND OF THE INVENTION

Field of the Invention

The present invention generally relates to parallel computation systems and, more specifically, to a technique for computational nested parallelism.

Description of the Related Art

In conventional computing systems having both a central processing unit (CPU) and a graphics processing unit (GPU), the CPU determines which specific computational tasks are performed by the GPU and in what order. A GPU computational task typically comprises highly parallel, highly similar operations across a parallel dataset, such as an image or set of images. In a conventional GPU execution model, the CPU initiates a particular computational task by selecting a corresponding thread program and instructing the GPU to execute a set of parallel instances of the thread program. In the conventional GPU execution model, only the CPU may initiate execution of a thread program on the GPU. After all thread instances complete execution, the GPU must notify the CPU and wait for another computational task to be issued by the CPU. Notifying the CPU and waiting for the next computational task is typically a blocking, serialized operation that leaves certain resources within the GPU temporarily idle, thereby reducing overall system performance.

Performance may be improved in certain scenarios by queuing up sequential computational tasks in a pushbuffer, from which the GPU may pull and perform work without waiting for the CPU. Computational tasks comprising fixed data-flow processing pipelines benefit from this pushbuffer model when the CPU is able to generate work for the GPU quickly enough to have work pending within the pushbuffer whenever the GPU is able to start a new task. However, data-dependent computational tasks are still left with a sequential dependence between GPU results, CPU task management, and subsequent GPU task execution, which must be launched by the CPU. Such data-dependent computational tasks inherently involve conditional execution, and therefore inherently require CPU involvement to facilitate flow control decisions because only the CPU may initiate execution of conditionally determined tasks. For example, algorithms that involve complex conditional execution of parallel library functions may not be performed entirely by the GPU. For such algorithms, the CPU must be involved at every flow control decision point where a parallel library function may conditionally execute. Thus, the conventional GPU execution model is of limited help in implementing data-dependent algorithms because determining which subsequent computational tasks need to run depends on the results of previous computational tasks, which must then be transmitted back to the CPU before subsequent tasks can be determined and issued to the GPU for execution.

Conditional execution is an inherent aspect of algorithms representing a significant portion of all known algorithms in the art. These algorithms do not fully benefit from potential efficiencies of GPU processing because of fundamental and long-standing limitations related to conditional execution in conventional GPU execution models.

Accordingly, what is needed in the art is a technique for enhanced GPU computational generality and performance.

SUMMARY OF THE INVENTION

One embodiment of the present invention sets forth a computer-implemented method for executing a child thread grid that is associated with a parent thread within a parallel processor. The method includes receiving a first launch request from the parent thread for executing the child thread grid, where the parent thread executes within a first streaming multiprocessor within the parallel processor, launching the child thread grid within a second streaming multiprocessor within the parallel processor, receiving a thread synchronization barrier request from the parent thread, where the parent thread is configured to block a first programming instruction corresponding to the thread synchronization barrier request from executing, suspending execution of the parent thread, receiving a notification that the child thread grid has completed executing, and causing the parent thread to resume executing.

One advantage of the disclosed method is that a parallel processing subsystem may be programmed to perform a richer set of programming constructs, such as conditionally executed and nested operations, externally defined library functions, recursive functions, and application-level control code, without the additional complexity associated with CPU involvement and coordination. With the disclosed technique, fundamental and long-standing limitations in parallel processing systems are advantageously overcome.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details.

System Overview

Figure 1:
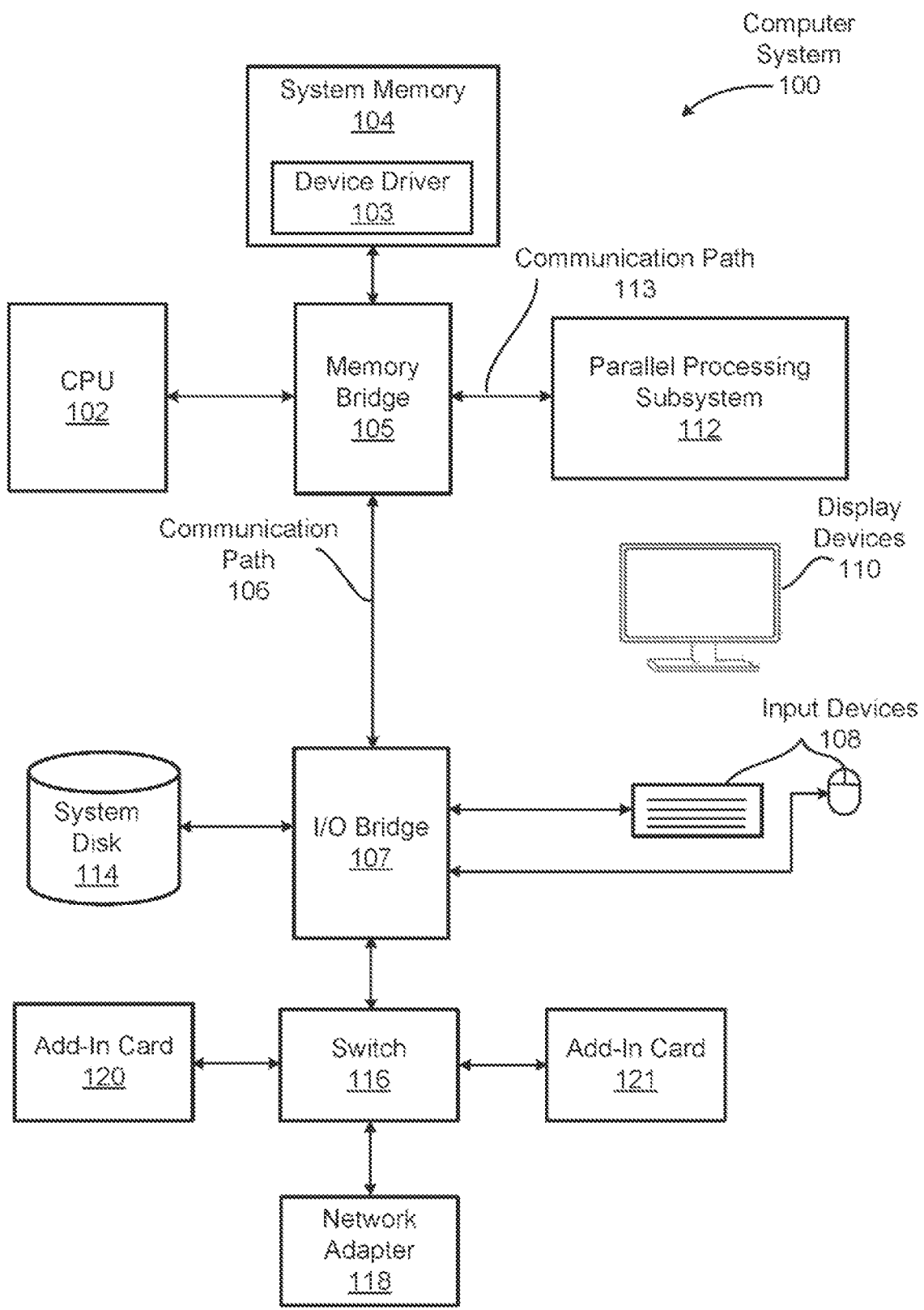
FIG. 1 is a block diagram illustrating a computer system configured to implement one or more aspects of the present invention.

FIG. 1 is a block diagram illustrating a computer system 100 configured to implement one or more aspects of the present invention. Computer system 100 includes a central processing unit (CPU) 102 and a system memory 104 communicating via an interconnection path that may include a memory bridge 105. Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via communication path 106 and memory bridge 105. A parallel processing subsystem 112 is coupled to memory bridge 105 via a bus or second communication path 113 (e.g., a Peripheral Component Interconnect (PCI) Express, Accelerated Graphics Port, or HyperTransport link); in one embodiment parallel processing subsystem 112 is a graphics subsystem that delivers pixels to a display device 110 (e.g., a conventional cathode ray tube or liquid crystal display based monitor). A system disk 114 is also connected to I/O bridge 107. A switch 116 provides connections between I/O bridge 107 and other components such as a network adapter 118 and various add-in cards 120 and 121. Other components (not explicitly shown), including universal serial bus (USB) or other port connections, compact disc (CD) drives, digital video disc (DVD) drives, film recording devices, and the like, may also be connected to I/O bridge 107. The various communication paths shown in FIG. 1, including the specifically named communication paths 106 and 113 may be implemented using any suitable protocols, such as PCI Express, AGP (Accelerated Graphics Port), HyperTransport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements in a single subsystem, such as joining the memory bridge 105, CPU 102, and I/O bridge 107 to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip instead of existing as one or more discrete devices. Large embodiments may include two or more CPUs 102 and two or more parallel processing subsystems 112. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Figure 2:
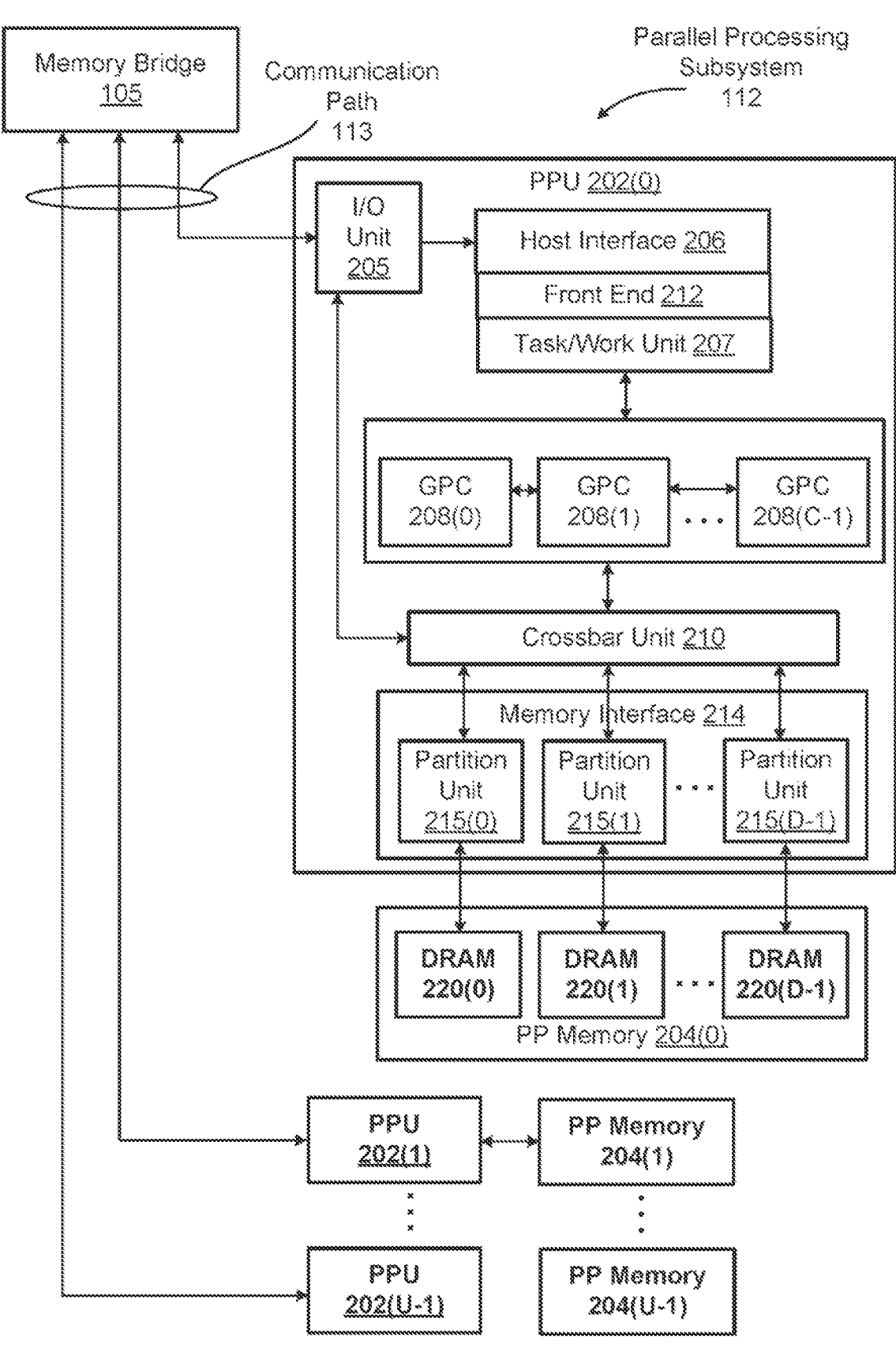
FIG. 2 is a block diagram of a parallel processing subsystem for the computer system of FIG. 1, according to one embodiment of the present invention.

FIG. 2 illustrates a parallel processing subsystem 112, according to one embodiment of the present invention. As shown, parallel processing subsystem 112 includes one or more parallel processing units (PPUs) 202, each of which is coupled to a local parallel processing (PP) memory 204. In general, a parallel processing subsystem includes a number U of PPUs, where U≥1. (Herein, multiple instances of like objects are denoted with reference numbers identifying the object and parenthetical numbers identifying the instance where needed.) PPUs 202 and parallel processing memories 204 may be implemented using one or more integrated circuit devices, such as programmable processors, application specific integrated circuits (ASICs), or memory devices, or in any other technically feasible fashion.

Referring again to FIG. 1 as well as FIG. 2, in some embodiments, some or all of PPUs 202 in parallel processing subsystem 112 are graphics processors with rendering pipelines that can be configured to perform various operations related to generating pixel data from graphics data supplied by CPU 102 and/or system memory 104 via memory bridge 105 and the second communication path 113, interacting with local parallel processing memory 204 (which can be used as graphics memory including, e.g., a conventional frame buffer) to store and update pixel data, delivering pixel data to display device 110, and the like. In some embodiments, parallel processing subsystem 112 may include one or more PPUs 202 that operate as graphics processors and one or more other PPUs 202 that are used for general-purpose computations. The PPUs may be identical or different, and each PPU may have a dedicated parallel processing memory device(s) or no dedicated parallel processing memory device(s). One or more PPUs 202 in parallel processing subsystem 112 may output data to display device 110 or each PPU 202 in parallel processing subsystem 112 may output data to one or more display devices 110.

In operation, CPU 102 is the master processor of computer system 100, controlling and coordinating operations of other system components. In particular, CPU 102 issues commands that control the operation of PPUs 202. In some embodiments, CPU 102 writes a stream of commands for each PPU 202 to a data structure (not explicitly shown in either FIG. 1 or FIG. 2) that may be located in system memory 104, parallel processing memory 204, or another storage location accessible to both CPU 102 and PPU 202. A pointer to each data structure is written to a pushbuffer to initiate processing of the stream of commands in the data structure. The PPU 202 reads command streams from one or more pushbuffers and then executes commands asynchronously relative to the operation of CPU 102. Execution priorities may be specified for each pushbuffer by an application program via the device driver 103 to control scheduling of the different pushbuffers.

Referring back now to FIG. 2 as well as FIG. 1, each PPU 202 includes an I/O (input/output) unit 205 that communicates with the rest of computer system 100 via communication path 113, which connects to memory bridge 105 (or, in one alternative embodiment, directly to CPU 102). The connection of PPU 202 to the rest of computer system 100 may also be varied. In some embodiments, parallel processing subsystem 112 is implemented as an add-in card that can be inserted into an expansion slot of computer system 100. In other embodiments, a PPU 202 can be integrated on a single chip with a bus bridge, such as memory bridge 105 or I/O bridge 107. In still other embodiments, some or all elements of PPU 202 may be integrated on a single chip with CPU 102.

In one embodiment, communication path 113 is a PCI Express link, in which dedicated lanes are allocated to each PPU 202, as is known in the art. Other communication paths may also be used. An I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to parallel processing memory 204) may be directed to a memory crossbar unit 210. Host interface 206 reads each pushbuffer and outputs the command stream stored in the pushbuffer to a front end 212.

Each PPU 202 advantageously implements a highly parallel processing architecture. As shown in detail, PPU 202(0) includes a processing cluster array 230 that includes a number C of general processing clusters (GPCs) 208, where C≥1. Each GPC 208 is capable of executing a large number (e.g., hundreds or thousands) of threads concurrently, where each thread is an instance of a program. In various applications, different GPCs 208 may be allocated for processing different types of programs or for performing different types of computations. The allocation of GPCs 208 may vary dependent on the workload arising for each type of program or computation.

GPCs 208 receive processing tasks to be executed from a work distribution unit within a task/work unit 207. The work distribution unit receives pointers to processing tasks that are encoded as task metadata (TMD) and stored in memory. The pointers to TMDs are included in the command stream that is stored as a pushbuffer and received by the front end unit 212 from the host interface 206. Processing tasks that may be encoded as TMDs include indices of data to be processed, as well as state parameters and commands defining how the data is to be processed (e.g., what program is to be executed). The task/work unit 207 receives tasks from the front end 212 and ensures that GPCs 208 are configured to a valid state before the processing specified by each one of the TMDs is initiated. A priority may be specified for each TMD that is used to schedule execution of the processing task. Processing tasks can also be received from the processing cluster array 230. Optionally, the TMD can include a parameter that controls whether the TMD is added to the head or the tail for a list of processing tasks (or list of pointers to the processing tasks), thereby providing another level of control over priority.

Memory interface 214 includes a number D of partition units 215 that are each directly coupled to a portion of parallel processing memory 204, where D≥1. As shown, the number of partition units 215 generally equals the number of dynamic random access memory (DRAM) 220. In other embodiments, the number of partition units 215 may not equal the number of memory devices. Persons of ordinary skill in the art will appreciate that DRAM 220 may be replaced with other suitable storage devices and can be of generally conventional design. A detailed description is therefore omitted. Render targets, such as frame buffers or texture maps may be stored across DRAMs 220, allowing partition units 215 to write portions of each render target in parallel to efficiently use the available bandwidth of parallel processing memory 204.

Any one of GPCs 208 may process data to be written to any of the DRAMs 220 within parallel processing memory 204. Crossbar unit 210 is configured to route the output of each GPC 208 to the input of any partition unit 215 or to another GPC 208 for further processing. GPCs 208 communicate with memory interface 214 through crossbar unit 210 to read from or write to various external memory devices. In one embodiment, crossbar unit 210 has a connection to memory interface 214 to communicate with I/O unit 205, as well as a connection to local parallel processing memory 204, thereby enabling the processing cores within the different GPCs 208 to communicate with system memory 104 or other memory that is not local to PPU 202. In the embodiment shown in FIG. 2, crossbar unit 210 is directly connected with I/O unit 205. Crossbar unit 210 may use virtual channels to separate traffic streams between the GPCs 208 and partition units 215.

Again, GPCs 208 can be programmed to execute processing tasks relating to a wide variety of applications, including but not limited to, linear and nonlinear data transforms, filtering of video and/or audio .data, modeling operations (e.g., applying laws of physics to determine position, velocity and other attributes of objects), image rendering operations (e.g., tessellation shader, vertex shader, geometry shader, and/or pixel shader programs), and so on. PPUs 202 may transfer data from system memory 104 and/or local parallel processing memories 204 into internal (on-chip) memory, process the data, and write result data back to system memory 104 and/or local parallel processing memories 204, where such data can be accessed by other system components, including CPU 102 or another parallel processing subsystem 112.

A PPU 202 may be provided with any amount of local parallel processing memory 204, including no local memory, and may use local memory and system memory in any combination. For instance, a PPU 202 can be a graphics processor in a unified memory architecture (UMA) embodiment. In such embodiments, little or no dedicated graphics (parallel processing) memory would be provided, and PPU 202 would use system memory exclusively or almost exclusively. In UMA embodiments, a PPU 202 may be integrated into a bridge chip or processor chip or provided as a discrete chip with a high-speed link (e.g., PCI Express) connecting the PPU 202 to system memory via a bridge chip or other communication means.

As noted above, any number of PPUs 202 can be included in a parallel processing subsystem 112. For instance, multiple PPUs 202 can be provided on a single add-in card, or multiple add-in cards can be connected to communication path 113, or one or more of PPUs 202 can be integrated into a bridge chip. PPUs 202 in a multi-PPU system may be identical to or different from one another. For instance, different PPUs 202 might have different numbers of processing cores, different amounts of local parallel processing memory, and so on. Where multiple PPUs 202 are present, those PPUs may be operated in parallel to process data at a higher throughput than is possible with a single PPU 202. Systems incorporating one or more PPUs 202 may be implemented in a variety of configurations and form factors, including desktop, laptop, or handheld personal computers, servers, workstations, game consoles, embedded systems, and the like.

Multiple Concurrent Task Scheduling

Multiple processing tasks may be executed concurrently on the GPCs 208 and a processing task may generate one or more "child" processing tasks during execution. The task/work unit 207 receives the tasks and dynamically schedules the processing tasks and child processing tasks for execution by the GPCs 208.

Figure 3A:
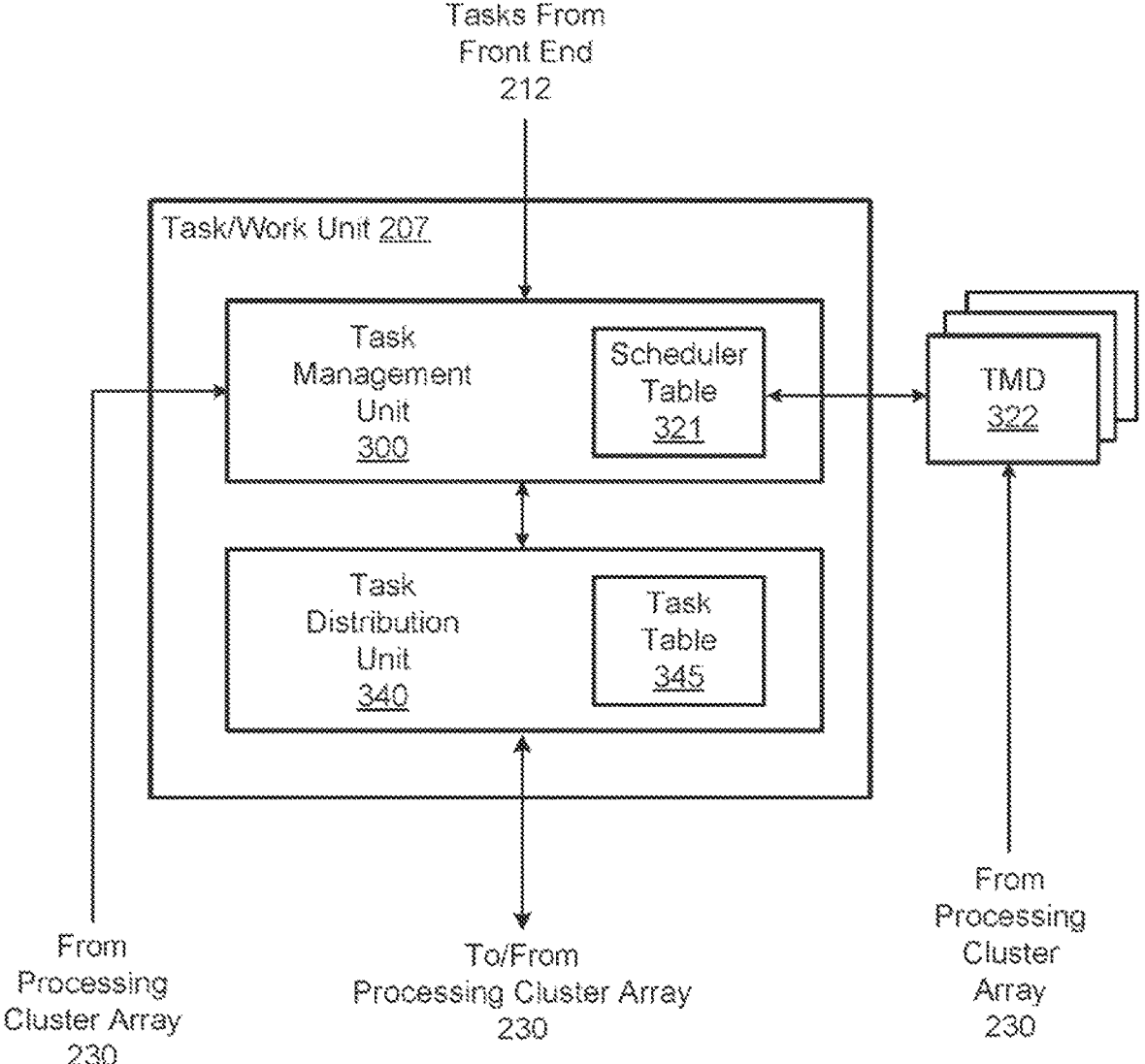
FIG. 3A is a block diagram of the front end of FIG. 2, according to one embodiment of the present invention.

FIG. 3A is a block diagram of the task/work unit 207 of FIG. 2, according to one embodiment of the present invention. The task/work unit 207 includes a task management unit 300 and the work distribution unit 340. The task management unit 300 organizes tasks to be scheduled based on execution priority levels. For each priority level, the task management unit 300 stores a list of pointers to the TMDs 322 corresponding to the tasks in the scheduler table 321, where the list may be implemented as a linked list. The TMDs 322 may be stored in the PP memory 204 or system memory 104. The rate at which the task management unit 300 accepts tasks and stores the tasks in the scheduler table 321 is decoupled from the rate at which the task management unit 300 schedules tasks for execution. Therefore, the task management unit 300 may collect several tasks before scheduling the tasks. The collected tasks may then be scheduled, based on priority information or using other techniques, such as round-robin scheduling.

The work distribution unit 340 includes a task table 345 with slots that may each be occupied by the TMD 322 for a task that is being executed. The task management unit 300 may schedule tasks for execution when there is a free slot in the task table 345. When there is not a free slot, a higher priority task that does not occupy a slot may evict a lower priority task that does occupy a slot. When a task is evicted, the task is stopped, and if execution of the task is not complete, then a pointer to the task is added to a list of task pointers to be scheduled (not shown) so that execution of the task will resume at a later time once any dependencies introduced are resolved by subsequently re-presenting the stopped task to the Task Management Unit. When a child processing task is generated, during execution of a task, a pointer to the child task is added to the list of task pointers eligible to be to be scheduled immediately by the Task Management Unit. A child task may be generated by a TMD 322 executing in the processing cluster array 230. In one embodiment, tasks that are stopped at a synchronization barrier are added to a first list of task pointers, while tasks that are created as children are added to a second list of task pointers, distinct from the first list of task pointers. Furthermore, child tasks associated with the second list of task pointers may be executed immediately and with higher priority than tasks associated with the first list of task pointers.

Unlike a task that is received by the task/work unit 207 from the front end 212, child tasks are received from the processing cluster array 230. Child tasks are not inserted into pushbuffers or transmitted to the front end. The CPU 102 is not notified when a child task is generated or data for the child task is stored in memory.

Task Processing Overview

Figure 3B:
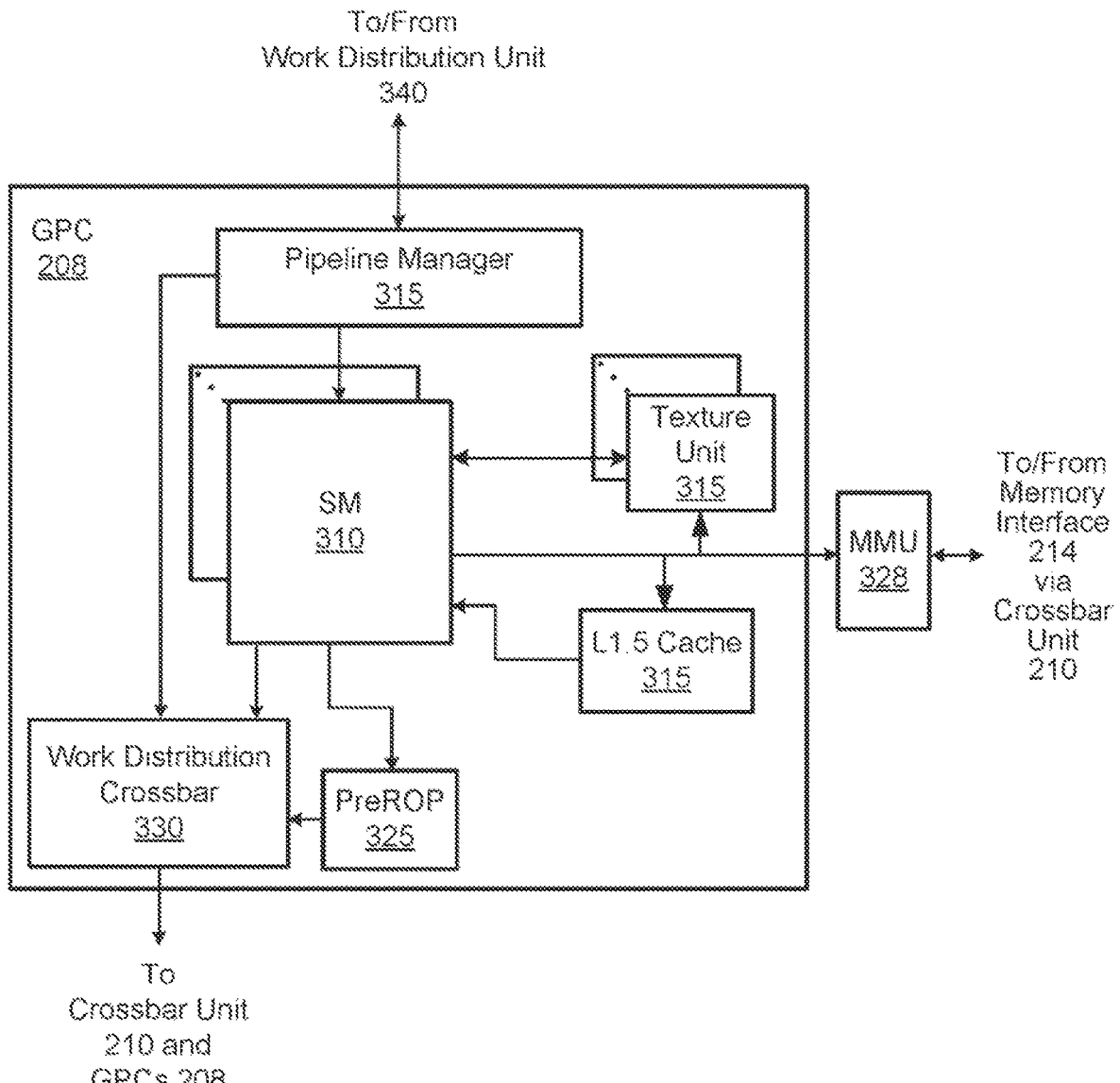
FIG. 3B is a block diagram of a general processing cluster within one of the parallel processing units of FIG. 2, according to one embodiment of the present invention.

FIG. 3B is a block diagram of a GPC 208 within one of the PPUs 202 of FIG. 2, according to one embodiment of the present invention. Each GPC 208 may be configured to execute a large number of threads in parallel, where the term "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within each one of the GPCs 208. Unlike a SIMD execution regime, where all processing engines typically execute identical instructions, SIMT execution allows different threads to more readily follow divergent execution paths through a given thread program. Persons of ordinary skill in the art will understand that a SIMD processing regime represents a functional subset of a SIMT processing regime.

Operation of GPC 208 is advantageously controlled via a pipeline manager 305 that distributes processing tasks to streaming multiprocessors (SMs) 310. Pipeline manager 305 may also be configured to control a work distribution crossbar 330 by specifying destinations for processed data output by SMs 310.

In one embodiment, each GPC 208 includes a number M of SMs 310, where M≥1, each SM 310 configured to process one or more thread groups.

Figure 3C:
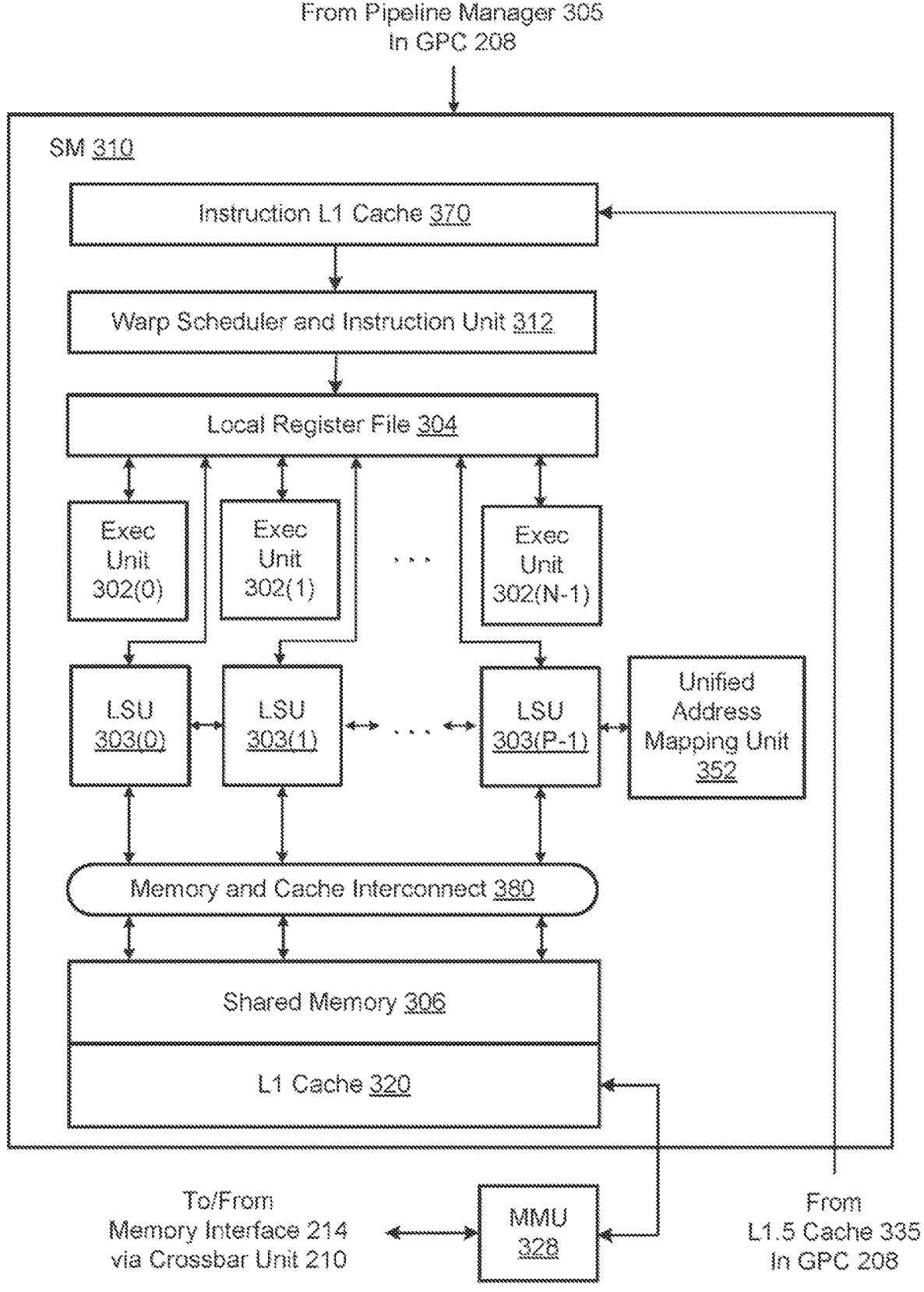
FIG. 3C is a block diagram of a portion of the streaming multiprocessor of FIG. 3B, according to one embodiment of the present invention.

Also, each SM 310 advantageously includes an identical set of functional execution units (e.g., execution units and load-store units-shown as Exec units 302 and LSUs 303 in FIG. 3C) that may be pipelined, allowing a new instruction to be issued before a previous instruction has finished, as is known in the art. Any combination of functional execution units may be provided. In one embodiment, the functional units support a variety of operations including integer and floating point arithmetic (e.g., addition and multiplication), comparison operations, Boolean operations (AND, OR, XOR), bit-shifting, and computation of various algebraic functions (e.g., planar interpolation, trigonometric, exponential, and logarithmic functions, etc.); and the same functional unit hardware can be leveraged to perform different operations. The series of instructions transmitted to a particular GPC 208 constitutes a thread, as previously defined herein, and the collection of a certain number of concurrently executing threads across the parallel processing engines (not shown) within an SM 310 is referred to herein as a "warp" or "thread group." As used herein, a "thread group" refers to a group of threads concurrently executing the same program on different input data, with one thread of the group being assigned to a different processing engine within an SM 310. A thread group may include fewer threads than the number of processing engines within the SM 310, in which case some processing engines will be idle during cycles when that thread group is being processed. A thread group may also include more threads than the number of processing engines within the SM 310, in which case processing will take place over consecutive clock cycles. Since each SM 310 can support up to G thread groups concurrently, it follows that up to G*M thread groups can be executing in GPC 208 at any given time.

Additionally, a plurality of related thread groups may be active (in different phases of execution) at the same time within an SM 310. This collection of thread groups is referred to herein as a "cooperative thread array" ("CTA") or "thread array." The size of a particular CTA is equal to m*k, where k is the number of concurrently executing threads in a thread group and is typically an integer multiple of the number of parallel processing engines within the SM 310, and m is the number of thread groups simultaneously active within the SM 310. The size of a CTA is generally determined by the programmer and the amount of hardware resources, such as memory or registers, available to the CTA.

Each SM 310 contains a level one (L1) cache (shown in FIG. 3C) or uses space in a corresponding L1 cache outside of the SM 310 that is used to perform load and store operations. Each SM 310 also has access to level two (L2) caches that are shared among all GPCs 208 and may be used to transfer data between threads. Finally, SMs 310 also have access to off-chip "global" memory, which can include, e.g., parallel processing memory 204 and/or system memory 104. It is to be understood that any memory external to PPU 202 may be used as global memory. Additionally, a level one-point-five (L1.5) cache 335 may be included within the GPC 208, configured to receive and hold data fetched from memory via memory interface 214 requested by SM 310, including instructions, uniform data, and constant data, and provide the requested data to SM 310. Embodiments having multiple SMs 310 in GPC 208 beneficially share common instructions and data cached in L1.5 cache 335.

Each GPC 208 may include a memory management unit (MMU) 328 that is configured to map virtual addresses into physical addresses. In other embodiments, MMU(s) 328 may reside within the memory interface 214. The MMU 328 includes a set of page table entries (PTEs) used to map a virtual address to a physical address of a tile and optionally a cache line index. The MMU 328 may include address translation lookaside buffers (TLB) or caches which may reside within multiprocessor SM 310 or the L1 cache or GPC 208. The physical address is processed to distribute surface data access locality to allow efficient request interleaving among partition units 215. The cache line index may be used to determine whether or not a request for a cache line is a hit or miss.

In graphics and computing applications, a GPC 208 may be configured such that each SM 310 is coupled to a texture unit 315 for performing texture mapping operations, e.g., determining texture sample positions, reading texture data, and filtering the texture data. Texture data is read from an internal texture L1 cache (not shown) or in some embodiments from the L1 cache within SM 310 and is fetched from an L2 cache that is shared between all GPCs 208, parallel processing memory 204, or system memory 104, as needed. Each SM 310 outputs processed tasks to work distribution crossbar 330 in order to provide the processed task to another GPC 208 for further processing or to store the processed task in an L2 cache, parallel processing memory 204, or system memory 104 via crossbar unit 210. A preROP (pre-raster operations) 325 is configured to receive data from SM 310, direct data to ROP units within partition units 215, and perform optimizations for color blending, organize pixel color data, and perform address translations.

It will be appreciated that the core architecture described herein is illustrative and that variations and modifications are possible. Any number of processing units, e.g., SMs 310 or texture units 315, preROPs 325 may be' included within a GPC 208. Further, as shown in FIG. 2, a PPU 202 may include any number of GPCs 208 that are advantageously functionally similar to one another so that execution behavior does not depend on which GPC 208 receives a particular processing task. Further, each GPC 208 advantageously operates independently of other GPCs 208 using separate and distinct processing units, L1 caches to execute tasks for one or more application programs.

Persons of ordinary skill in the art will understand that the architecture described in FIGS. 1, 2, 3A, and 3B in no way limits the scope of the present invention and that the techniques taught herein may be implemented on any properly configured processing unit, including, without limitation, one or more CPUs, one or more multi-core CPUs, one or more PPUs 202, one or more GPCs 208, one or more graphics or special purpose processing units, or the like, without departing the scope of the present invention.

In embodiments of the present invention, it is desirable to use PPU 202 or other processor(s) of a computing system to execute general-purpose computations using thread arrays. Each thread in the thread array is assigned a unique thread identifier ("thread ID") that is accessible to the thread during the thread's execution. The thread ID, which can be defined as a one-dimensional or multi-dimensional numerical value controls various aspects of the thread's processing behavior. For instance, a thread ID may be used to determine which portion of the input data set a thread is to process and/or to determine which portion of an output data set a thread is to produce or write.

A sequence of per-thread instructions may include at least one instruction that defines a cooperative behavior between the representative thread and one or more other threads of the thread array. For example, the sequence of per-thread instructions might include an instruction to suspend execution of operations for the representative thread at a particular point in the sequence until such time as one or more of the other threads reach that particular point, an instruction for the representative thread to store data in a shared memory to which one or more of the other threads have access, an instruction for the representative thread to atomically read and update data stored in a shared memory to which one or more of the other threads have access based on their thread IDs, or the like. The CTA program can also include an instruction to compute an address in the shared memory from which data is to be read, with the address being a function of thread ID. By defining suitable functions and providing synchronization techniques, data can be written to a given location in shared memory by one thread of a CTA and read from that location by a different thread of the same CTA in a predictable manner. Consequently, any desired pattern of data sharing among threads can be supported, and any thread in a CTA can share data with any other thread in the same CTA. The extent, if any, of data sharing among threads of a CTA is determined by the CTA program; thus, it is to be understood that in a particular application that uses CTAs, the threads of a CTA might or might not actually share data with each other, depending on the CTA program, and the terms "CTA" and "thread array" are used synonymously herein.

FIG. 3C is a block diagram of the SM 310 of FIG. 3B, according to one embodiment of the present invention. The SM 310 includes an instruction L1 cache 370 that is configured to receive instructions and constants from memory via L1.5 cache 335. A warp scheduler and instruction unit 312 receives instructions and constants from the instruction L1 cache 370 and controls local register file 304 and SM 310 functional units according to the instructions and constants. The SM 310 functional units include N exec (execution or processing) units 302 and P load-store units (LSU) 303.

SM 310 provides on-chip (internal) data storage with different levels of accessibility. Special registers (not shown) are readable but not writeable by LSU 303 and are used to store parameters defining each thread's "position." In one embodiment, special registers include one register per thread (or per exec unit 302 within SM 310) that stores a thread ID; each thread ID register is accessible only by a respective one of the exec unit 302. Special registers may also include additional registers, readable by all threads that execute the same processing task represented by a TMD 322 (or by all LSUs 303) that store a CTA identifier, the CTA dimensions, the dimensions of a grid to which the CTA belongs (or queue position if the TMD 322 encodes a queue task instead of a grid task), and an identifier of the TMD 322 to which the CTA is assigned.

If the TMD 322 is a grid TMD, execution of the TMD 322 causes a fixed number of CTAs to be launched and executed to process the fixed amount of data stored in the queue 525. The number of CTAs is specified as the product of the grid width, height, and depth. The fixed amount of data may be stored in the TMD 322 or the TMD 322 may store a pointer to the data that will be processed by the CTAs. The TMD 322 also stores a starting address of the program that is executed by the CTAs.

CTAs that belong to a grid have implicit grid width, height, and depth parameters indicating the position of the respective CTA within the grid. Special registers are written during initialization in response to commands received via front end 212 from device driver 103 and do not change during execution of a processing task. The front end 212 schedules each processing task for execution. Each CTA is associated with a specific TMD 322 for concurrent execution of one or more tasks. Additionally, a single GPC 208 may execute multiple tasks concurrently.

A parameter memory (not shown) stores runtime parameters (constants) that can be read but not written by any thread within the same CTA (or any LSU 303). In one embodiment, device driver 103 provides parameters to the parameter memory before directing SM 310 to begin execution of a task that uses these parameters. Any thread within any CTA (or any exec unit 302 within SM 310) can access global memory through a memory interface 214. Portions of global memory may be stored in the L1 cache 320.

Local register file 304 is used by each thread as scratch space; each register is allocated for the exclusive use of one thread, and data in any of local register file 304 is accessible only to the thread to which the register is allocated. Local register file 304 can be implemented as a register file that is physically or logically divided into P lanes, each having some number of entries (where each entry might store, e.g., a 32-bit word). One lane is assigned to each of the N exec units 302 and P load-store units LSU 303, and corresponding entries in different lanes can be populated with data for different threads executing the same program to facilitate SIMD execution. Different portions of the lanes can be allocated to different ones of the G concurrent thread groups, so that a given entry in the local register file 304 is accessible only to a particular thread. In one embodiment, certain entries within the local register file 304 are reserved for storing thread identifiers, implementing one of the special registers. Additionally, a uniform L1 cache 375 stores uniform or constant values for each lane of the N exec units 302 and P load-store units LSU 303.

Shared memory 306 is accessible to threads within a single CTA; in other words, any location in shared memory 306 is accessible to any thread within the same CTA (or to any processing engine within SM 310). Shared memory 306 can be implemented as a shared register file or shared on-chip cache memory with an interconnect that allows any processing engine to read from or write to any location in the shared memory. In other embodiments, shared state space might map onto a per-CTA region of off-chip memory, and be cached in L1 cache 320. The parameter memory can be implemented as a designated section within the same shared register file or shared cache memory that implements shared memory 306, or as a separate shared register file or on-chip cache memory to which the LSUs 303 have read-only access. In one embodiment, the area that implements the parameter memory is also used to store the CTA ID and task ID, as well as CTA and grid dimensions or queue position, implementing portions of the special registers. Each LSU 303 in SM 310 is coupled to a unified address mapping unit 352 that converts an address provided for load and store instructions that are specified in a unified memory space into an address in each distinct memory space. Consequently, an instruction may be used to access any of the local, shared, or global memory spaces by specifying an address in the unified memory space.

The L1 cache 320 in each SM 310 can be used to cache private per-thread local data and also per-application global data. In some embodiments, the per-CTA shared data may be cached in the L1 cache 320. The LSUs 303 are coupled to the shared memory 306 and the L1 cache 320 via a memory and cache interconnect 380.

Graphics Pipeline Architecture

Figure 4:
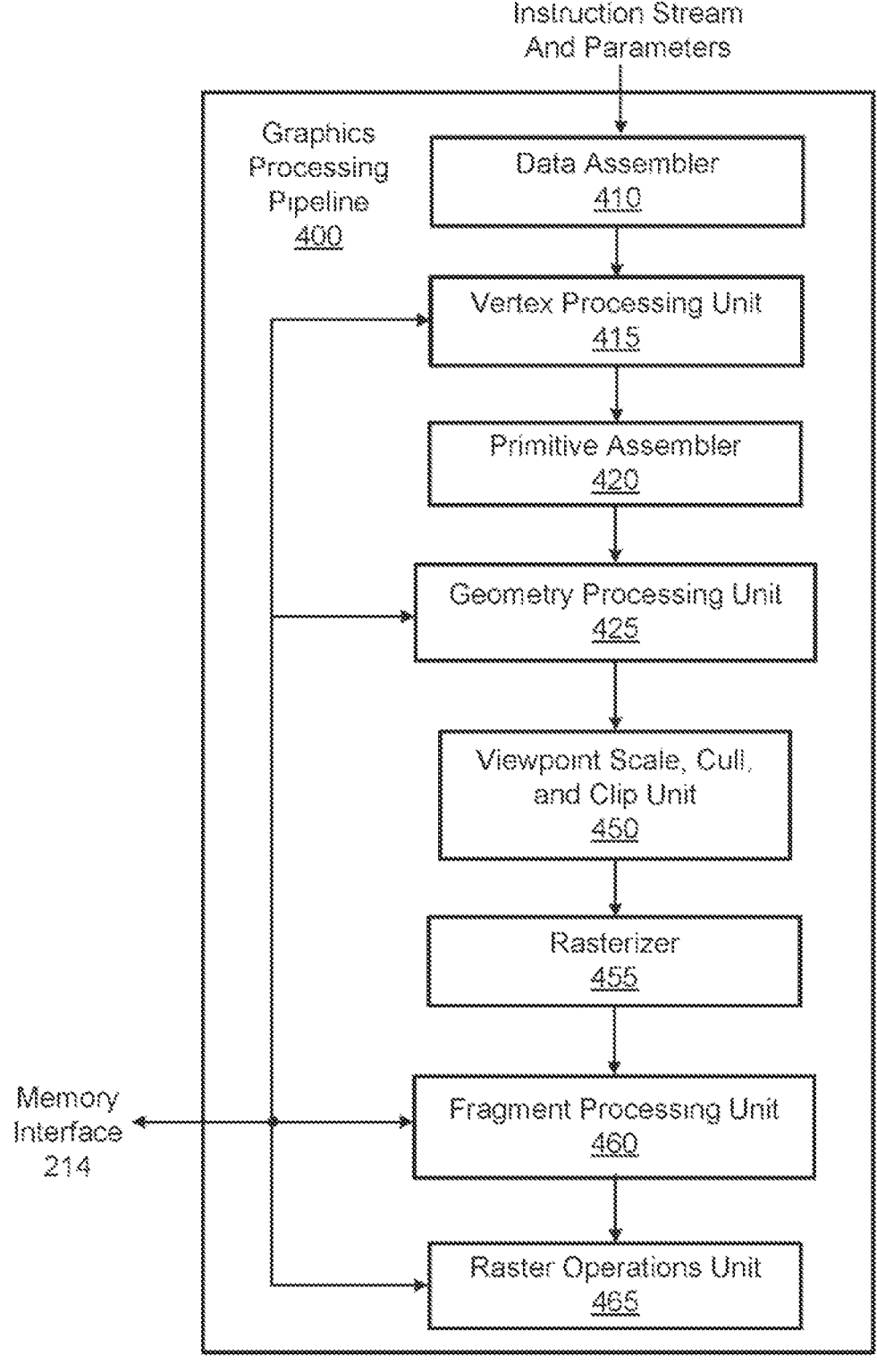
FIG. 4 is a conceptual diagram of a graphics processing pipeline that one or more of the parallel processing units of FIG. 2 can be configured to implement, according to one embodiment of the present invention.

FIG. 4 is a conceptual diagram of a graphics processing pipeline 400, that one or more of the PPUs 202 of FIG. 2 can be configured to implement, according to one embodiment of the present invention. For example, one of the SMs 310 may be configured to perform the functions of one or more of a vertex processing unit 415, a geometry processing unit 425, and a fragment processing unit 460. The functions of data assembler 410, primitive assembler 420, rasterizer 455, and raster operations unit 465 may also be performed by other processing engines within a GPC 208 and a corresponding partition unit 215. Alternately, graphics processing pipeline 400 may be implemented using dedicated processing units for one or more functions.

Data assembler 410 processing unit collects vertex data for high-order surfaces, primitives, and the like, and outputs the vertex data, including the vertex attributes, to vertex processing unit 415. Vertex processing unit 415 is a programmable execution unit that is configured to execute vertex shader programs, lighting and transforming vertex data as specified by the vertex shader programs. For example, vertex processing unit 415 may be programmed to transform the vertex data from an object-based coordinate representation (object space) to an alternatively based coordinate system such as world space or normalized device coordinates (NDC) space. Vertex processing unit 415 may read data that is stored in L1 cache 320, parallel processing memory 204, or system memory 104 by data assembler 410 for use in processing the vertex data.

Primitive assembler 420 receives vertex attributes from vertex processing unit 415, reading stored vertex attributes, as needed, and constructs graphics primitives for processing by geometry processing unit 425. Graphics primitives include triangles, line segments, points, and the like. Geometry processing unit 425 is a programmable execution unit that is configured to execute geometry shader programs, transforming graphics primitives received from primitive assembler 420 as specified by the geometry shader programs. For example, geometry processing unit 425 may be programmed to subdivide the graphics primitives into one or more new graphics primitives and calculate parameters, such as plane equation coefficients, that are used to rasterize the new graphics primitives.

In some embodiments, geometry processing unit 425 may also add or delete elements in the geometry stream. Geometry processing unit 425 outputs the parameters and vertices specifying new graphics primitives to a viewport scale, cull, and clip unit 450. Geometry processing unit 425 may read data that is stored in parallel processing memory 204 or system memory 104 for use in processing the geometry data. Viewport scale, cull, and clip unit 450 performs clipping, culling, and viewport scaling and outputs processed graphics primitives to a rasterizer 455.

Rasterizer 455 scan converts the new graphics primitives and outputs fragments and coverage data to fragment processing unit 460. Additionally, rasterizer 455 may be configured to perform z culling and other z-based optimizations.

Fragment processing unit 460 is a programmable execution unit that is configured to execute fragment shader programs, transforming fragments received from rasterizer 455, as specified by the fragment shader programs. For example, fragment processing unit 460 may be programmed to perform operations such as perspective correction, texture mapping, shading, blending, and the like, to produce shaded fragments that are output to raster operations unit 465. Fragment processing unit 460 may read data that is stored in parallel processing memory 204 or system memory 104 for use in processing the fragment data. Fragments may be shaded at pixel, sample, or other granularity, depending on the programmed sampling rate.

Raster operations unit 465 is a processing unit that performs raster operations, such as stencil, z test, blending, and the like, and outputs pixel data as processed graphics data for storage in graphics memory. The processed graphics data may be stored in graphics memory, e.g., parallel processing memory 204, and/or system memory 104, for display on display device 110 or for further processing by CPU 102 or parallel processing subsystem 112. In some embodiments of the present invention, raster operations unit 465 is configured to compress z or color data that is written to memory and decompress z or color data that is read from memory.

Nested Parallelism

Nested parallelism enables threads within a thread group, described above, to independently launch one or more child thread groups and to perform thread synchronization boundaries on the one or more child thread groups to maintain proper execution order. This fundamental capability enables broad classes of algorithms that require conditional execution to be mapped efficiently onto parallel processing subsystem 112. General computing applications, as well as applications involving graphics pipeline processing pipeline 400 may be advantageously implemented using nested parallelism techniques described herein.

Figure 5:
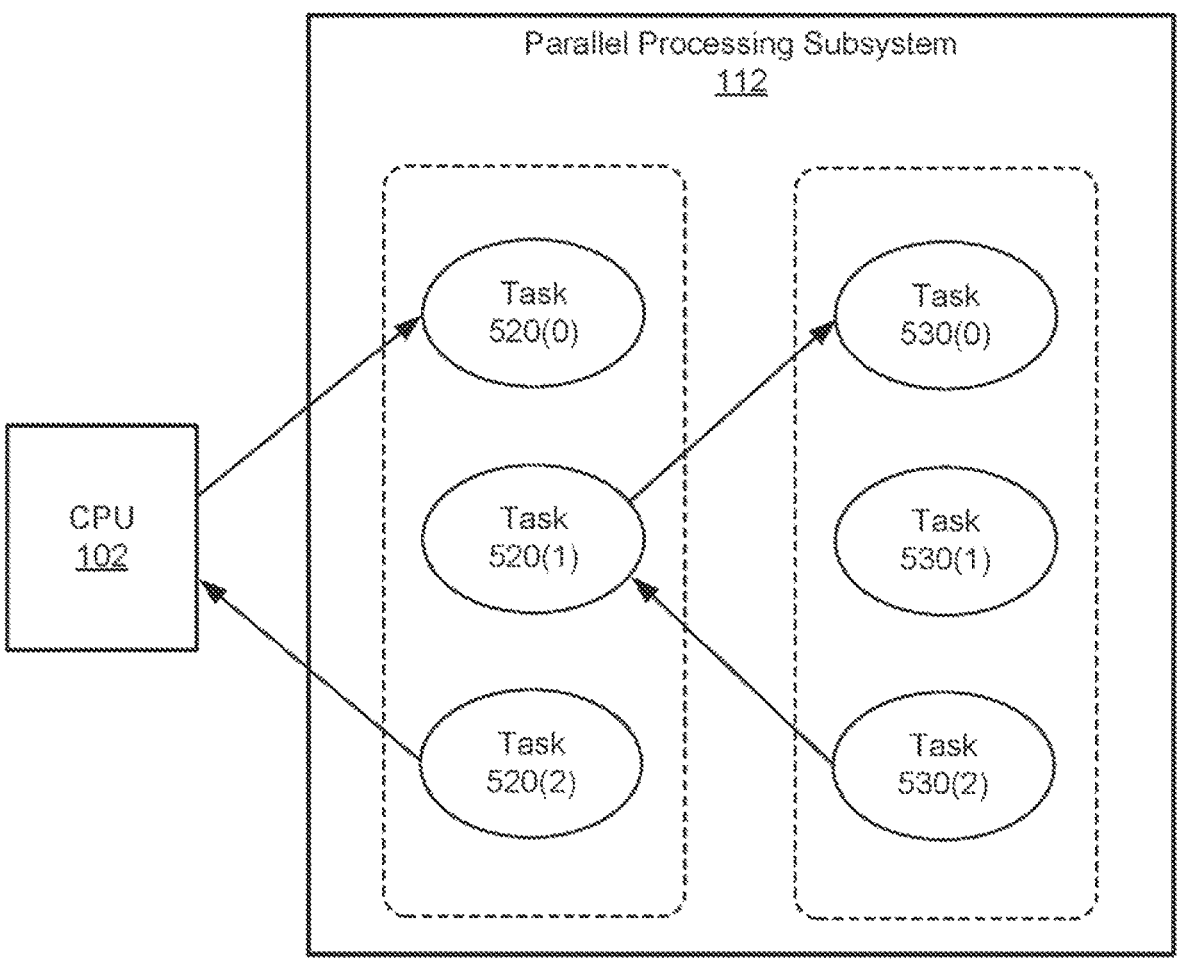
FIG. 5 illustrates nested task execution on a parallel processing subsystem, according to one embodiment of the present invention.

FIG. 5 illustrates nested task execution on parallel processing subsystem 112, according to one embodiment of the present invention. As shown, CPU 102 initiates execution of exemplary tasks 520 on parallel processing subsystem 112. After task 520(0) completes, task 520(1) executes. After task 520(1) completes, task 520(2) executes. During the course of execution, task 520(1) invokes tasks 530(0) through 530(2), for example, to compute an intermediate result used by task 520(1). To maintain proper instruction execution order, task 520(1) should wait until tasks 530 complete before continuing. To wait in this way, task 520(1) may block at a thread synchronization barrier on tasks 530. Each task 520, 530 may be performed by one or more threads, CTAs, or grids, as defined previously.

In this example, task 520(1) is a parent of tasks 530, which are therefore children of task 520(1). While only one level of parent-child hierarchy (nesting depth) is shown in FIG. 5, an arbitrary hierarchy may be implemented in practice. In one embodiment, nesting depth is limited by a number of scheduling groups. Priority may be assigned to child execution over parent execution within the scheduling groups. In one embodiment, tasks 520 and 530 each execute as at least one thread group, or at least one CTA within SM 310 of FIG. 3B. To enable thread programs having a parent and child relationship to execute on SM 310, three system elements should be implemented, including hardware functionality for parallel processing subsystem 112, software runtime functionality for parallel processing subsystem 112, and language support constructs for programming parallel processing subsystem 112.

The hardware functionality required to support a parent thread launching a child thread, CTA, or grid within parallel processing subsystem 112 includes launching a new grid or CTA of work from a request generated by SM 310 and queued for execution to task/work unit 207, saving execution state for SM 310, continuing execution within SM 310 from the saved execution state, and facilitating memory coherence between a parent and child task. The runtime features required to support a parent thread launching a child thread, CTA, or grid within processing subsystem 112 includes launching a new grid in response to a request from a thread executing within SM 310, enabling a parent thread to perform a thread synchronization barrier on a child thread group, ensuring memory coherence between the parent thread and the child group, scheduling work and continuation of synchronized thread groups for guaranteed forward computational progress, and ensuring proper execution semantics for parent threads and child groups. The language support constructs include a mechanism for specifying the launch of a child thread program from a parent thread, and executing a synchronization barrier on the child program.

Parallel processing subsystem 112 is programmed using a thread-oriented programming environment, such as the CUDA(™) programming environment from NVIDIA(™). In one embodiment, the CUDA language specification is expanded to include a child launch construct ("$<<<>>>$") to specify details for launching a child CUDA grid. The child launch construct, indicated herein as "A$<<<$B$>>>$C", includes a child program name (A), grid launch parameters (B), and input parameters (C). The CUDA runtime environment is expanded to enable a parent thread to perform a synchronization barrier on the child CUDA grid. Although the present discussion illustrates embodiments of the invention in the context of the CUDA programming environment, persons skilled in the art will recognize that the techniques taught herein are applicable to any parallel programming environment and any parallel processing system. As such, references to CUDA are for illustrative purposes only and are not intended to limit to scope or spirit of the present invention.

Table 1, below, illustrates use of the child launch construct and synchronization barrier in an exemplary CUDA program:

TABLE 1

```
___global___ void foo( )
{
    void *ptr = malloc(1024);
    A<<< 1, 1 >>>(ptr);   // child launch
    cudaThreadSynchronize( );   // sync barrier
    do__stuff(ptr);
}
```

In this example, an instance of thread program "foo( )" launches a child grid using a thread program "A" with a pointer (*ptr) to memory allocated by foo( ). The allocated memory is accessible to threads within the child grid. The parent thread foo( ) is able to continue after child grid A completes, indicated by a return from a blocking synchronization barrier function call, herein named cudaThreadSynchronize( ).

Figure 6:
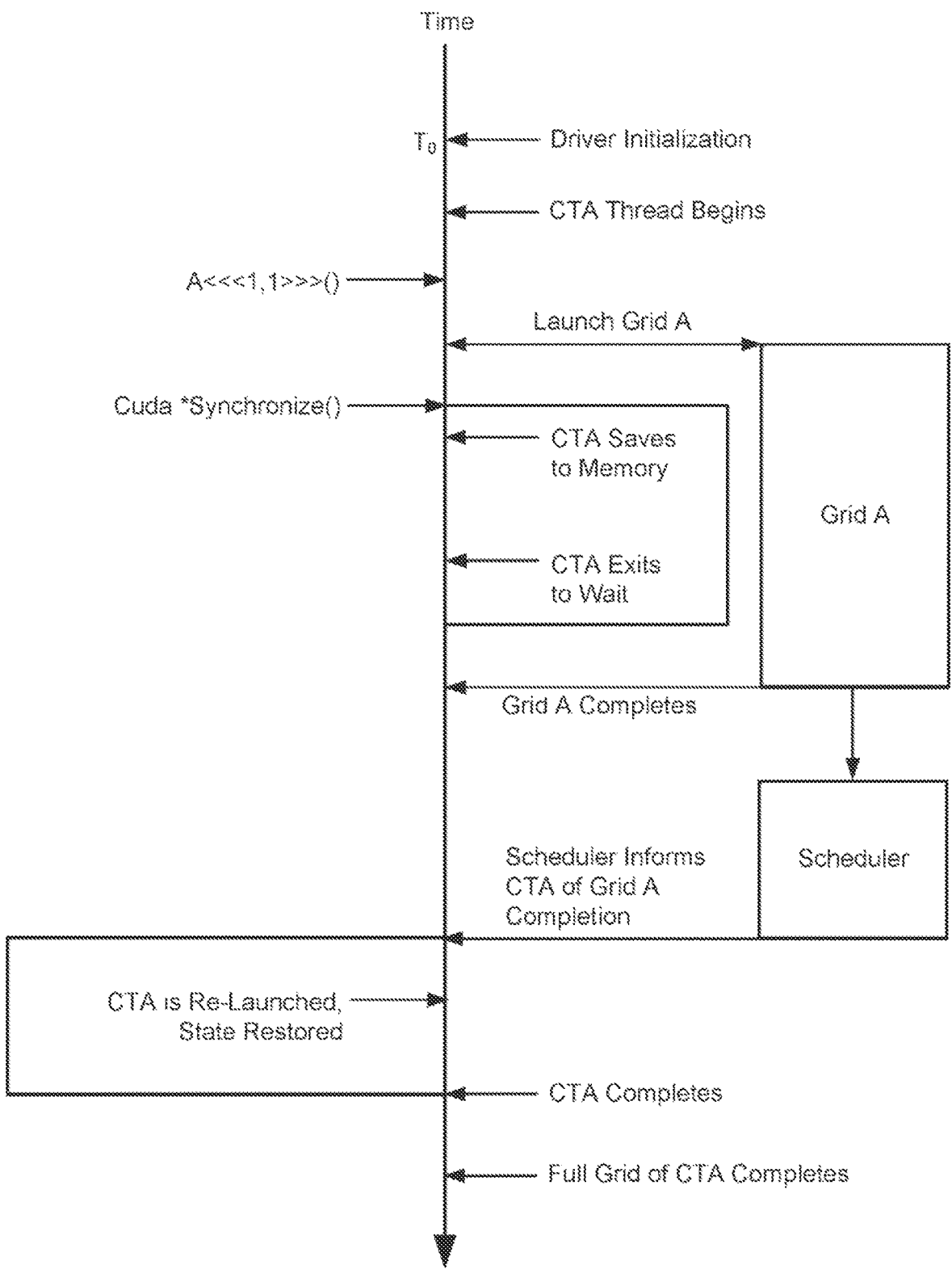
FIG. 6 illustrates a sequence of events for a parent thread program to launch a child grid, according to an embodiment of the present invention.

FIG. 6 illustrates a sequence of events 600 for a parent thread program to launch a child grid, according to an embodiment of the present invention. Referring back to Table 1, the parent thread may be an instance of thread program foo( ), while the child grid may comprise child grid A( ), launched according to the child launch construct.

The sequence of events 600 begins at time TO, where a software driver for parallel processing subsystem 112, such as device driver 103, initializes a CTA within SM 310. For example, the software driver may initialize foo( ) from Table 1 as a CTA within SM 310. Subsequently, the CTA begins to execute as at least one thread. For example, a thread of "foo( )" with thread identifier x==0, y==0 begins to execute. The thread then executes a child launch using child launch construct "A<<<1, 1>>>." The child launch process, described in greater detail below, causes child grid A to begin executing. At this point, the thread is a parent thread of child grid A. The parent thread then executes a call to cudaThreadSynchronize( ), which blocks execution of the parent thread until child grid A completes. Because the call to cudaThreadSynchronize( ) is for synchronizing to a child grid, the CTA associated with the parent thread may be halted while waiting for the child grid. To halt the CTA, execution state for the CTA is saved to a continuation state buffer. The continuation state buffer may reside in PP memory 204, system memory 104, or any other technically feasible memory storage subsystem coupled to parallel processing subsystem 112. The CTA then exits and waits for child grid A to complete. Upon exiting, SM 310 is freed and may be assigned other tasks for execution while child grid A executes. In one embodiment, resources associated with the CTA and allocated from SM 310 are de-allocated. Deadlock is avoided because the CTA foo( ) releases resources to allow forward computational progress.

Once child grid A completes, a scheduler, such as task/work unit 207 of FIG. 2, is notified. The CTA having the parent thread is then scheduled to be re-launched with execution state restored from the continuation state buffer. The CTA is informed that child grid A completed, allowing execution of the parent thread to progress through the synchronization barrier established earlier by a call to cudaThreadSynchronize( ). The CTA subsequently completes, and any associated grid of CTAs is then able to complete.

In one embodiment, the process of a parent thread launching a child grid comprises preparing memory elements within parallel processing subsystem 112 to present the child grid with a consistent view a memory space associated with the parent. Launching the child grid may be implemented using CUDA runtime calls, including a system memory barrier (membar.sys) to guarantee memory consistency between parent and child. Executing the system memory barrier has the effect of flushing all pending write data from the parent to memory, such as PP memory 204. Flushing all pending writes allows any thread within the child grid to safely read arbitrary data from the memory space of the parent while executing on an arbitrary SM 310. Those of ordinary skill in the art will understand that flushing caches is one means to ensuring memory consistency, but other approaches are possible.

Once the memory barrier has been executed, a CUDA runtime call, referred to herein as cudaRTLaunch( ), may be executed to launch the child grid. In one embodiment, the CUDA runtime call to cudaRTLaunch( ) queues a new task for execution to the scheduler by presenting a posted compare and swap (PCAS) message to a memory management unit, such as MMU 328 of FIG. 3B, which reflects the message back to the scheduler. A PCAS operation represents one mechanism for SM 310 to schedule work. In one embodiment, the PCAS operation is implemented as a blocking (posted) synchronization operation that is performed by MMU 328. The PCAS operation atomically compares a present value of memory at a specified memory location to a first specified value and over writes the memory location with a second specified value if, and only if, the present value of memory matches the first specified value.

The thread synchronization barrier call cudaThreadSynchronize( ), shown in Table 1, initiates a series of events to save the current execution state of the calling (soon to be parent) thread. In this example, the calling thread is foo( ). The call to cudaThreadSynchronize( ) may explicitly reference a child grid being launched by the calling thread. In one embodiment, parallel processing subsystem 112 is configured to save all relevant execution state for a CTA executing within a GPC 208, including all relevant architectural state for each associated SM 310, to the continuation state buffer. In certain embodiments, one or more continuation state buffers reside in predetermined locations in memory.

Upon completion of the child grid a scheduling mechanism is invoked to decide what task(s) should be scheduled to run next. A thread program is also commonly referred to as a "kernel." In one embodiment a scheduler kernel is invoked as an "AtExit" task that executes when a grid, such as the child grid, completes. The scheduler kernel discovers what related work has been completed and what work remains outstanding. The scheduler kernel then decides what should be scheduled to run next. In the example of Table 1, the scheduler kernel re-launches CTA foo( ).

The process of re-launching a parent CTA after a child completes is referred to herein as a continuation process. In one embodiment this involves executing a restoration kernel, invoked as an "AtEntry" task, to restore execution state from a continuation state buffer for the grid. While a restoration kernel may be implemented to restore execution state, any technically feasible technique may be implemented to restore execution state without departing the scope and spirit of the present invention. To ensure memory consistency upon continued execution, caches for SM 310 executing the grid are invalidated, forcing out any irrelevant or stale state from a previous grid executing within the same SM 310. Those of ordinary skill in the art will understand that flushing caches is one means to ensuring memory consistency, but other approaches are possible. After restoring execution state, and after ensuring memory consistency, the restoration kernel resumes execution of the parent CTA by jumping to the instruction following the cudaThreadSynchronize( ) call.

As with any CUDA thread program, each thread executes independently. Therefore, if a given thread program is coded to perform an unconditional launch, then every executing instance of the thread program will perform that launch command. In an exemplary CUDA program, shown in Table 2, each instance of foo( ) performs an unconditional launch of kernel "bar( )", yielding a net of one hundred executing bar( ) kernels.

TABLE 2

```
___global___ void foo( )
{
        void *ptr = malloc(1024);
        bar<<< 1, 1 >>>(ptr);
        cudaThreadSynchronize( );
        do_stuff(ptr);
}
void main( )
{
        // Launch 100 threads of "foo"
        foo<<< 1, 100 >>>( );
        cudaThreadSynchronize( );
}
```

A modified version of the CUDA program in Table 2 is given in Table 3. In this modified CUDA program, only one thread (with x==0) from foo( ) executes, so only this one thread from foo( ), executing independently, actually launches a child grid. In this example, only one total child grid comprising thread program bar( ) is launched from all one hundred executing instances of foo( ).

TABLE 3

```
___global___ void foo( )
{
        void *ptr = malloc(1024);
        if(threadIdx.x == 0)
        bar<<< 1, 1 >>>(ptr);
        cudaThreadSynchronize( );
        do_stuff(ptr);
}
void main( )
{
        // Launch 100 threads of "foo"
        foo <<< 1, 100 >>>( );
        cudaThreadSynchronize( );
}
```

Although each CUDA thread executes independently, CUDA primitives may be used by all threads within a thread block. For example, one thread may create a CUDA stream and any other thread within the thread block may use the stream. Each thread block, however, still remains independent. An exemplary CUDA thread program is shown in Table 4, where a parent thread program foo( ) creates a stream that is shared among threads within a child CTA of thread program bar( ).

TABLE 4

```
___shared___ cudaStream_t stream;
___global___ void foo( )
{
        if(threadIdx.x == 0)
                cudaStreamCreate(&stream);
        ___syncthreads( );
        bar<<< 1, 1, 0, stream >>>( );
        cudaThreadSynchronize( );
}
void main( )
{
        foo <<< 1, 100 >>>( );
        cudaThreadSynchronize( );
}
```

In one embodiment, a hierarchy of executing kernels having a parent and arbitrary child kernels is structured to be composable, meaning only the parent kernel is visible from outside the hierarchy. In other words, when a parent kernel launches child kernels, the child kernels appear as part of the parent kernel. This means the parent kernel and all child kernels must complete execution for the parent to be considered as having completed execution. By way of example, all work associated with task 520(0) of FIG. 5 must complete before task 520(1) is launched. Similarly, all work associated with task 520(1) and child tasks 530(0) through 530(2) must complete before task 520(1) is considered to have completed. Once task 520(1) has completed, task 520(2) may be launched.

Embodiments of the present invention advantageously enable a parent thread to independently launch one or more grids of child threads from within parallel processing subsystem 112. The ability to launch child threads enables new capabilities and approaches to the design of thread programs. For example, a thread program may call an externally defined library function by launching a corresponding kernel implementing the library function as a child. In another example, control over a substantial portion of data flow within an application may be performed by thread programs within parallel processing subsystem 112 without intervention by a related application executing on CPU 102. For example, implementing an overall control loop for an application within one or more threads executing on parallel processing subsystem 112 may enable the application to efficiently execute data-dependent algorithms, recursive algorithms, and algorithms with complex execution dependencies, such as multiply nested conditional loops.

An exemplary function, main( ), having nested conditional loops is illustrated in Table 5. As shown, this function has an unconditional outer loop with loop index "i", a nested conditional loop with index "j", and conditional execution of function do_stuff( ). Static unrolling of main( ) is not practical, nor is attempting to compute which conditional loop ranges should execute. As a consequence, conventional parallel processing systems are unable to efficiently process this and other types of conditional execution structures that are inherent to many important classes of algorithms known in the art.

TABLE 5

```
void main( ) {
        for(i...imax) {
```

TABLE 5-continued

```
if(condition1) for(j...jmax) {
    if(condition2) for(k...kmax) {
        if(condition3) do_stuff(data, i, j, k);
        }
    }
}
}
```

Embodiments of the present invention provide the child launch construct, which enables an independently executing thread program to compute when to call do_stuff( ). In Table 6, an instance of cuda_inner_loop( ) is conditionally launched as a child grid having kmax instances in only those iterations where "condition2" is met. The function do_stuff( ) is conditionally performed within cuda_inner_loop( ) when "condition3" is met. Note that each launched cuda_inner_loop( ) child advantageously executes asynchronously and concurrently with other instances of cuda_inner_loop( ). Implementing this loop structure would have been complex and inefficient using the conventional GPU execution model, because the CPU would have been required to conditionally launch each child grid of cuda_inner_loop( ), only when condition2 is met.

TABLE 6

```
___global___ void cuda_inner_loop(data, i, j) {
    if(condition3) do_stuff(data, i, j, threadIdx.x);
}
void main( ) {
    for(i...imax) {
        if(condition1) for(j...jmax) {
            if(condition2) {
                cuda_inner_loop<<< kmax >>>(data, i, j);
            }
        }
    }
}
```

Another implementation of the nested loop illustrated in Tables 5 and 6 is shown in Table 7. Here, the outer loop conditional may also be evaluated in parallel by separate threads, and each level of loop can now be launched conditionally as children if the appropriate condition or conditions are satisfied.

TABLE 7

```
___global___ void cuda_inner_loop (data, i, j) {
    if(condition) do_stuff(data, i, j, threadIdx.x);
}
___global___ void cnp_loop_j(data, i) {
    if(condition) cuda_inner_loop<<< kmax >>>(data, i,
threadIdx.x);
}
___global___ void cnp_loop_i(data, i) {
    if(condition) cnp_loop_j<<< jmax >>>(data,
threadIdx.x);
}
void main( ) {
    cnp_loop_i<<< imax >>>(data);
}
```

Figure 7:
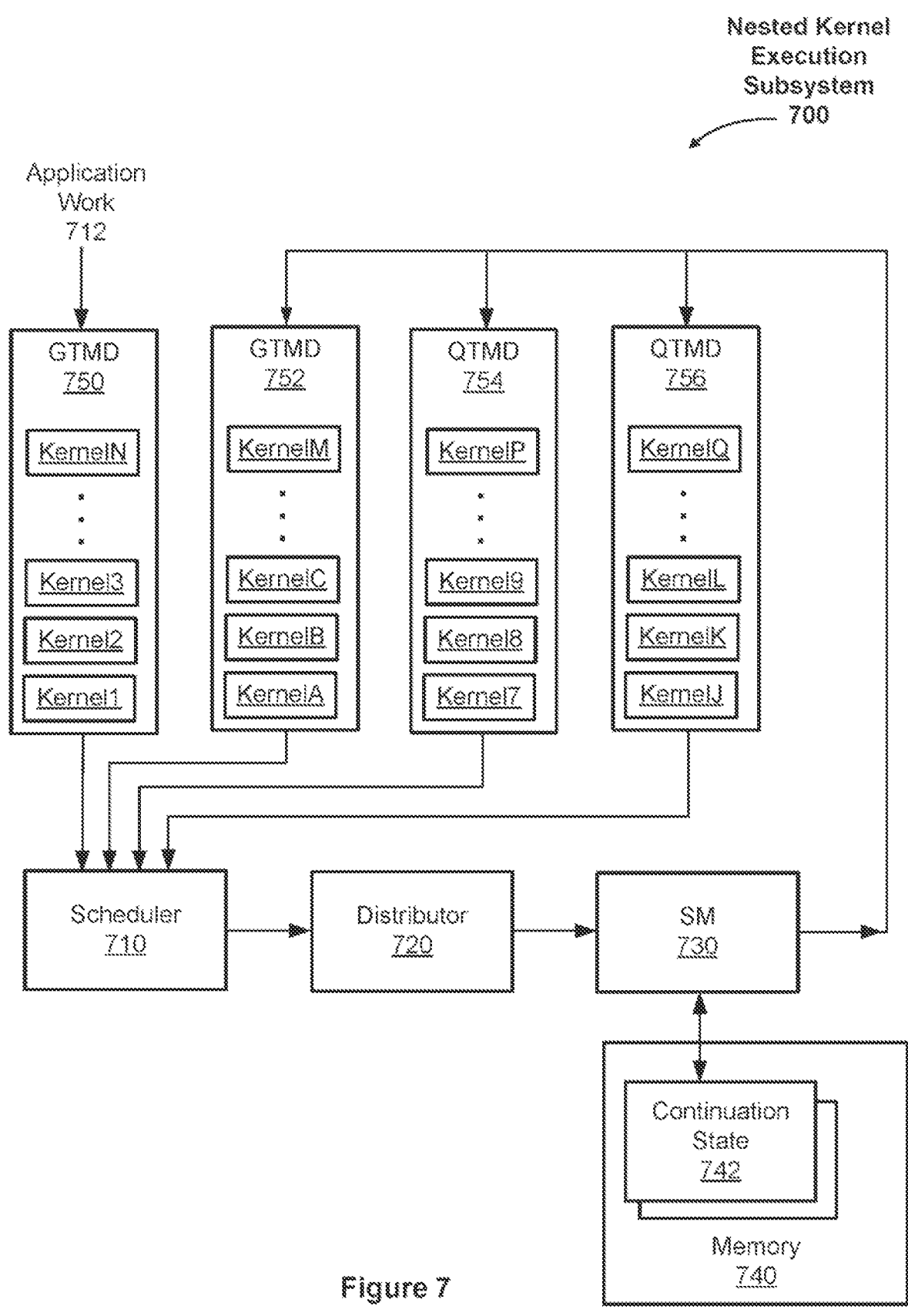
FIG. 7 illustrates system elements for a nested kernel execution subsystem, according to one embodiment of the present invention.

FIG. 7 illustrates system elements for a nested kernel execution subsystem 700, according to one embodiment of the present invention. Nested kernel execution subsystem 700 comprises hardware and software structures implemented within parallel processing subsystem 112 of FIG. 1, including a grid task metadata descriptor (GTMD) queue 750 for receiving and storing application work 712, for example from CPU 102 of FIG. 1. The application work 712 comprises an ordered sequence of GTMDs, labeled kernel1 through kernelN. The scheduler 710 is configured to receive each GTMD and schedule a corresponding grid for execution on the SM 730 via the distributor, which serves to allocated threads as CTAs within the SM 730. The continuation state buffer discussed in FIG. 6 may be stored in continuation state buffer 742, residing within memory 740. In one embodiment, scheduler 710 comprises task management unit 300 of FIG. 3A, distributor 720 comprises work distribution unit 340, SM 730 comprises SM 310 of FIG. 3B, and memory 740 comprises PP memory 204, system memory 104, or a combination thereof.

When a thread executing within SM 730 launches a child CTA, a new GTMD is generated for the child CTA and queued for execution within GTMD queue 752. Scheduler 710 is able to distinguish new application work 712 arriving from GTMD queue 750 from nested processing work arriving in GTMD queue 752 because each set of work is stored in separate queues. Scheduler 710 may assign different execution priority at different times to work stored in each GTMD queue using any technically feasible technique that guarantees forward execution progress.

When a grid executing within SM 730 is halted in response to calling cudaThreadSynchronize( ), execution state is stored to continuation state buffer 742, and a scheduler kernel is queued for execution. In one embodiment, the scheduler kernel is queued for execution in a queue of task metadata descriptors QTMD 754. For example, Kernel7 may comprise a descriptor for a scheduler kernel queued for execution within QTMD 754 by a CTA that previously exited SM 730, and KernelP may comprise a most recent scheduler kernel queued for execution by a most recently exited CTA from SM 730.

In one embodiment, a restoration kernel is executed to prepare resources within SM 730 for resumed execution of a CTA that previously exited by executing cudaThreadSynchronize( ). In certain implementations, the restoration kernel is queued for execution within QTMD 754. In alternative implementations, the restoration kernel, such as KernelQ, is queued for execution within a separate QTMD 756 for greater scheduling flexibility. While execution restoration of the CTA is described above in terms of a restoration kernel, any other technically feasible technique may also be implemented to restore execution of the CTA without departing the scope and spirit of the present invention.

Nested kernel execution subsystem 700 provides a system for suspending and continuing execution of arbitrary thread groups within a parallel processing subsystem, while addressing memory consistency and proper execution semantics for each thread and each parent-child relationship.

Figure 8:
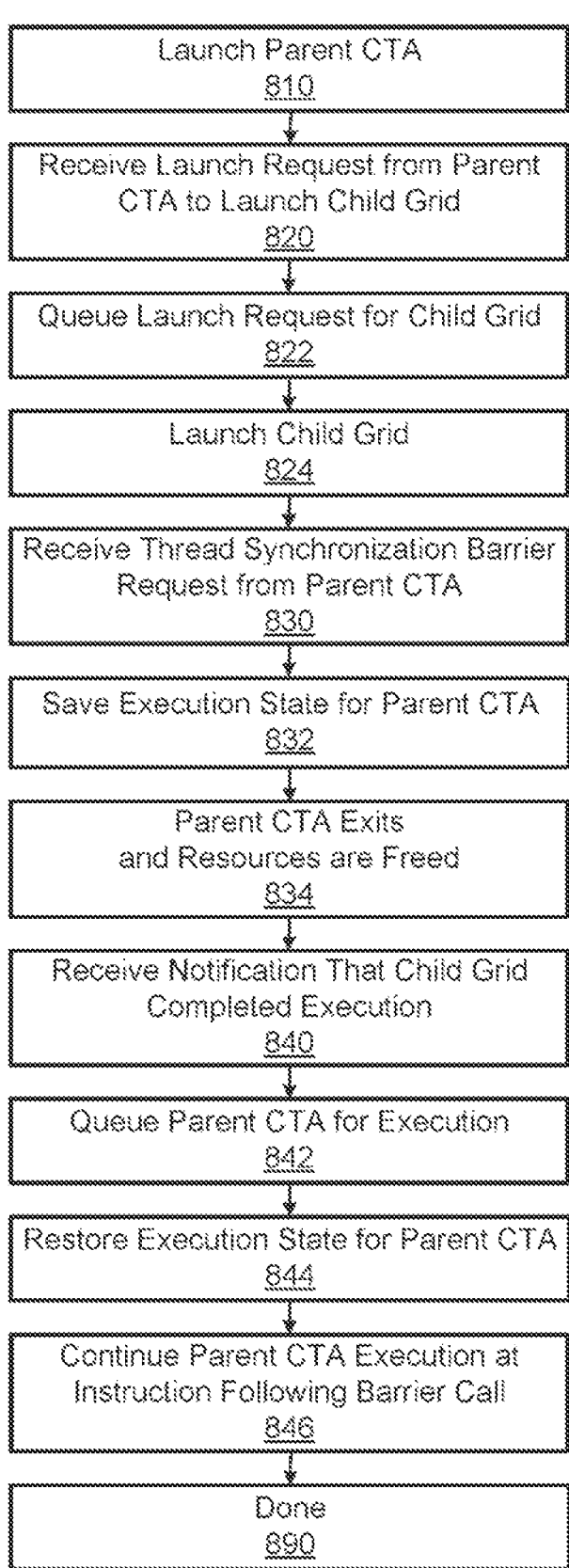
FIG. 8 is a flow diagram of method steps, performed by the nested kernel execution subsystem, for executing a child kernel, according to one embodiment of the present invention.

FIG. 8 is a flow diagram of method 800, performed by nested kernel execution subsystem 700, for executing a child kernel, according to one embodiment of the present invention. Although the method steps are described in conjunction with the systems of FIGS. 1-3C, 4, and 7, persons of ordinary skill in the art will understand that any system configured to perform the method steps, in any order, is within the scope of the inventions.

Method 800 begins in step 810, where nested kernel execution subsystem 700 launches a parent CTA. The parent CTA may comprise application work queued for execution by CPU 102 of FIG. 1 or work generated by another thread program acting as a parent to the parent CTA. In step 820, nested kernel execution subsystem 700 receives a launch request from the parent CTA to launch a child grid. In one embodiment, the launch request is structured according to the child launch construct, discussed previously in FIG. 5. In step 822, nested kernel execution subsystem 700 queues the launch request for a child grid as a grid task metadata descriptor within a GTMD queue, such as GTMD queue 752 of FIG. 7. In step 824, nested kernel execution subsystem 700 launches the child grid. In one embodiment, scheduler 710 receives the grid task metadata descriptor associated with the child grid from GTMD queue 752 and distributor 720 assigns corresponding work to SM 730. Assigning the work includes loading executable code for the child grid into the SM 730 and initiating execution of each instance of the child grid at a predetermined instruction within the child grid.

In step 830, nested kernel execution subsystem 700 receives a thread synchronization barrier request from the parent CTA, for example via a call to cudaThreadSynchronize( ). In step 832, nested kernel execution subsystem 700 saves execution state for the parent CTA in a continuation state buffer, such as continuation state buffer 742. In one embodiment, saving execution state for the parent CTA to continuation state buffer 742 is performed by a hardware unit within nested kernel execution subsystem 700. In an alternative embodiment, a continuation state function within the parent CTA is executed to save execution state of the parent CTA to continuation state buffer 742. In step 834, the parent CTA exits and related resources within SM 730 are freed. In certain embodiments, a memory barrier operation is performed to flush any pending writes to memory 740, thereby ensuring a consistent view of memory for the child grid, which will then have access to a most recent version of parent CTA memory state regardless of the SM in which the child grid actually executes.

In step 840, nested kernel execution subsystem 700 receives notification that the child grid has completed execution. In step 842, the parent CTA is queued for execution, for example via a GTMD entry being added to GTMD queue 752 by the scheduler kernel. In one embodiment, a scheduler kernel is launched in response to the child grid exiting, and the scheduler kernel adds the GTMD entry to GTMD queue 752 to queue up the parent CTA for execution. In step 844, nested kernel execution subsystem 700 restores execution state for the parent CTA. In one embodiment, a restoration kernel is responsible for restoring execution state of the parent CTA. In addition to restoring execution state for the parent CTA within SM 730 from continuation state buffer 742, the restoration kernel also facilitates memory consistency for the parent CTA. In one embodiment, the restoration kernel invalidates any related caches within SM 730 to avoid exposing the parent CTA to potentially stale data within the caches. In step 846, nested kernel execution subsystem 700 continues parent CTA execution at an instruction immediately following the thread barrier synchronization call within the parent CTA thread program. In one embodiment, the restoration kernel jumps to the instruction immediately following the thread barrier synchronization to facilitate continuation of parent CTA execution. The method terminates in step 890.

In sum, a technique for enabling nested kernel execution within a parallel processing subsystem is disclosed. The technique involves enabling a parent thread to launch a child grid on the parallel processing subsystem, and enabling the parent thread to perform a synchronization barrier on the child grid. To avoid deadlock scenarios arising from limited computation resources within the parallel processing subsystem, execution state for the parent thread is saved to a continuation state buffer while the child grid executes and restored after the child grid completes. An additional grid task metadata descriptor queue and at least one queue for task metadata descriptors are used to schedule work related to child execution and parent restoration. These techniques provide a general context switching mechanism that is both efficient and adheres to constraints associated with the parallel processing subsystem.

One advantage of the techniques described herein is that a parallel processing subsystem may be programmed to perform a richer set of programming constructs, such as conditionally executed and nested operations, externally defined library functions, recursive functions, and application-level control code, without the additional complexity associated with CPU involvement and coordination. Thus, the disclosed techniques advantageously overcome fundamental and long-standing limitations in parallel processing systems.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as compact disc read only memory (CD-ROM) disks readable by a CD-ROM drive, flash memory, read only memory (ROM) chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons of ordinary skill in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

In view of the foregoing, the scope of embodiments of the present invention is defined by the claims that follow.

What is claimed is:

1. A computer-readable storage medium having stored thereon instructions, which if performed by one or more processors, cause the one or more processors to at least:
cause one or more child thread grids to be launched by one or more parent thread arrays; and
call a thread synchronization barrier to prevent the one or more parent thread arrays from being performed until the one or more child thread grids have been completed, and, in response to the thread synchronization barrier, cause cache data of the one or more parent thread arrays to be stored in a graphics processing unit (GPU) memory accessible by the one or more child thread grids.

2. The computer-readable storage medium of claim 1, wherein the one or more processors comprise a graphics processing unit (GPU).

3. The computer-readable storage medium of claim 1, wherein the instructions, if performed by the one or more processors, cause the one or more processors to halt performance of the one or more parent thread arrays until the one or more child thread grids are completed, and to resume performance of the one or more parent thread arrays after completion of the one or more child thread grids.

4. The computer-readable storage medium of claim 1, wherein the instructions, if performed by the one or more processors, cause the one or more processors to store a state of the one or more parent thread arrays in response to a synchronization function call.

5. The computer-readable storage medium of claim 1, wherein the instructions, if performed by the one or more processors, cause the one or more processors to ensure memory coherence between the one or more parent thread arrays and the one or more child thread grids.

6. The computer-readable storage medium of claim 1, wherein the instructions, if performed by the one or more processors, cause the one or more processors to resume execution of the one or more parent thread arrays in response to notification that the one or more child thread grids have completed execution.

7. The computer-readable storage medium of claim 1, wherein:

the one or more processors comprise a graphics processing unit (GPU); and the instructions, if performed by the one or more processors, cause the one or more processors to:

store execution state of the one or more parent thread arrays in response to a synchronization function call;

receive a notification that performance of the one or more child thread grids have completed; and resume execution of the one or more parent thread arrays in response to notification that the one or more child thread grids have completed performance.

8. The computer-readable storage medium of claim 1, wherein the one or more processors comprise a graphics processing unit (GPU) and wherein the GPU comprises a cache to store the cache data.

9. The computer-readable storage medium of claim 1, wherein the one or more parent thread arrays comprise an instruction following a synchronization function call and wherein the instructions of the computer-readable storage medium, if performed by the one or more processors, cause the one or more processors to continue performance at the instruction following the synchronization function call.

10. The computer-readable storage medium of claim 1, wherein the one or more processors comprise a parallel processing unit (PPU).

11. One or more processors, comprising:

a plurality of cores;

a register file;

an LI cache;

a crossbar unit;

an instruction cache;

a scheduler; and circuitry to:

cause one or more child thread grids to be launched by one or more parent thread arrays; and call a thread synchronization barrier to prevent the one or more parent thread arrays from being performed until the one or more child thread grids have been completed, and, in response to the thread synchronization barrier, cause cache data of the one or more parent thread arrays to be stored in a graphics processing unit (GPU) memory accessible by the one or more child thread grids.

12. The one or more processors of claim 11, wherein the circuitry comprises a graphics processing unit (GPU).

13. The one or more processors of claim 11, wherein the circuitry is further to halt performance of the one or more parent thread arrays until the one or more child thread grids are completed, and resume performance of the one or more parent thread arrays after completion of performance of the one or more child thread grids.

14. The one or more processors of claim 11, wherein the circuitry is further to store a state of the one or more parent thread arrays in response to a synchronization function call.

15. The one or more processors of claim 11, wherein the circuitry is further to ensure memory coherence between the one or more parent thread arrays and the one or more child thread grids.

16. The one or more processors of claim 11, wherein the circuitry is further to resume performance of the one or more parent thread arrays in response to notification that the one or more child thread grids have completed performance.

17. The one or more processors of claim 11, wherein:

the one or more processors comprise a graphics processing unit (GPU); and the circuitry is further to:

store a state of the one or more parent thread arrays in response to a synchronization function call;

receive a notification that performance of the one or more child thread grids have completed; and resume performance of the one or more parent thread arrays in response to notification that the one or more child thread grids have completed performance.

18. The one or more processors of claim 11, wherein the one or more processors comprise a graphics processing unit (GPU).

19. The one or more processors of claim 11, wherein the one or more parent thread arrays comprise an instruction following a synchronization function call and wherein the circuitry is further to cause the one or more processors to continue performance at the instruction following the synchronization function call.

20. The one or more processors of claim 11, wherein the one or more processors comprise a parallel processing unit (PPU).

* * * * *